United States Patent [19]

Volman et al.

[11] 4,072,999
[45] Feb. 7, 1978

[54] OUTDOOR HIGH-VOLTAGE SWITCHGEAR ASSEMBLY

[76] Inventors: Mikhail Yakovlevich Volman, Lunny pereulok, 2, kv. 14; Vladimir Yakovlevich Grinshtein, ulitsa Sverdlova, 132, kv. 31, both of Odessa; Mikhail Leonidovich Zhukov, kvartal 3, dom 28, kv. 5, Kuibyshev; Ivan Anatolievich Kuchuk, ulitsa Engelsa, 36, kv. 1, Odessa; Evgeny Petrovich Polovinkin, kvartal 1, dom 8, kv. 10, Kuibyshev, all of U.S.S.R.

[21] Appl. No.: 705,895

[22] Filed: July 16, 1976

[51] Int. Cl.² ............................................. H02B 1/20
[52] U.S. Cl. ................................. 361/333; 361/341; 200/48 A
[58] Field of Search ............... 361/332, 333, 335, 341, 361/429; 200/48 R

[56] References Cited

U.S. PATENT DOCUMENTS

| 3,215,897 | 11/1965 | Hertig | 361/333 |
| 3,364,398 | 1/1968 | Stipcevich | 361/333 |

FOREIGN PATENT DOCUMENTS

| 143,929 | 7/1935 | Germany | 361/332 |

*Primary Examiner*—Gerald P. Tolin
*Attorney, Agent, or Firm*—Fleit & Jacobson

[57] ABSTRACT

An outdoor high-voltage switchgear assembly comprising rigid sectionalized busbars provided with busbar compensators made of flexible current-conducting members mounted on insulated supports through the use of bases having an open configuration and electrical apparatuses connected through branches to said sectionalized busbars, each base being composed of legs forming said open configuration in such a way that it is almost U-shaped, wherein said legs are placed in planes parallel to longitudinal axes of the sectionalized busbars, and the base is secured on the insulated support so that the ends of the base legs are higher than the horizontal plane going through the point common for both legs, each busbar compensator being secured by its ends to adjacent sections of the sectionalized busbars, which are attached at the ends of said base legs, and positioned between the longitudinal axes of these legs.

7 Claims, 12 Drawing Figures

OUTDOOR HIGH-VOLTAGE SWITCHGEAR ASSEMBLY

This invention relates to electric high-voltage substations and, in particular, to outdoor high-voltage switchgear assemblies and can be employed at electric substations as well as at electric power stations.

In modern practice rigid sectionalized busbars are known to be in wide use in outdoor high-voltage switchgear assemblies. Design of such busbars are diverse and depend on the requirements set to specific constructions of switchgear assemblies. Electric apparatuses or special busbar insulators, either suspension or supporting ones, are employed as mounts for sectionalized busbars. Sufficiently durable insulators are selected and installed to ensure stability of rigid sectionalized busbars against short-circuit currents and other loads or measures are taken to reduce these loads.

There is known a high-voltage switchgear assembly wherein rigid sectionalized busbars are secured by means of -shaped braces directly on supporting insulators of busbar separators or on rigid connecting conductors of these supporting insulators.

Such design of an outdoor switchgear assembly makes it impossible to make sections of the rigid busbars shorter than standard spacing of the bays of this device, which results in higher expenditure of materials and greater loads on supporting insulators.

There are also known busbar compensators which are made by welding plates and flexible wires to the ends of rigid busbars. Such design of a busbar compensator is fairly complicated and calls for its installation only in the course of assemblying sectionalized busbars on the construction site of the switchgear assembly. Employment of such compensators brings about higher labour consumption for manufacturing and assembly of busbar elements of a switchgear installation.

An object of this invention is to simplify the design and setting of outdoor switchgear assemblies.

Another object of this invention is to reduce consumption of materials for rigid sectionalized busbars.

Yet another object of the invention is to reduce the number of supporting insulators of sectionalized busbars and the value of loads acting on these insulators.

A further object of the invention is to increase the reliability of operation of outdoor switchgear assemblies and to improve their operational conditions.

A still further object of this invention is to provide a means for the employment of advanced shallow foundations for outdoor switchgear assemblies.

These objects are achieved by that in an outdoor switchgear assembly comprising rigid sectionalized busbars provided with busbar compensators made of flexible current-conducting members mounted on insulated supports through the use of bases having an open configuration and electrical apparatuses connected through branches to said sectionalized busbars, each base is, according to the invention, composed of legs forming said open configuration in such a way that it is almost U-shaped, said legs being positioned in planes parallel to the longitudinal axes of the sectionalized busbars, and the base is mounted on the insulated support so that the ends of the base legs are higher than the horizontal plane going through the point common for both legs, each busbar compensator being secured by its ends to adjacent sections of the sectionalized busbars, which are attached at the ends of said base legs, and positioned between the longitudinal axes of these legs.

It is advisable that each base of rigid sectionalized busbars be secured on insulating support by means of a crosspiece.

It is also advisable that each busbar compensator be made of two flexible members, one of their ends being secured to adjacent sections of sectionalized busbars mounted on the ends of the base and their other ends being connected to each other by a contact device linked to a branch of sectionalized busbars.

Each base can be also provided with a contact member to connect a branch of sectionalized busbars.

The proposed outdoor high-voltage switchgear assembly is characterized by simplicity of design and setting of all elements of rigid sectionalized busbars, busbar compensators and simplicity of connecting the branches from sectionalized busbars.

Employment of bases of the claimed design in switchgear assemblies to mount sectionalized busbars permits reduction of the length of section of sectionalized busbars, curtailment of their material consumption and decrease of loads acting on the supporting insulation of sectionalized busbars.

Employment of electrical apparatuses of the switchgear assembly as supporting insulation of sectionalized busbars reduces the number of supporting insulators.

Securing of adjacent sections of sectionalized busbars to bases and of cross-pieces to insulating supports ensure employment of advanced shallow foundations for such outdoor switchgear assemblies.

The forementioned advantages of the proposed outdoor switchgear assembly in general increase reliability of its operation and improve its operational conditions.

Simplier design of a switchgear assembly makes its manufacturing costs lower.

A better understanding of this invention may be gained from consideration of the following detailed description of embodiments of an outdoor high-voltage switchgear assembly taken in conjunction with the accompanying drawings, wherein.

Let us consider by way of example an outdoor high-voltage switchgear assembly arranged in a circuit with two work and one by-pass busbar systems.

Figure 1:
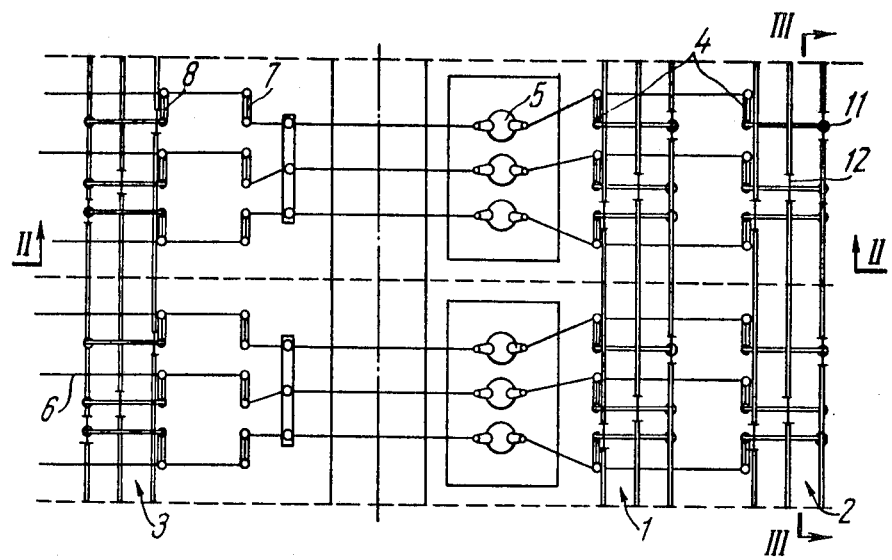
FIG. 1 shows a plan view of an outdoor high-voltage switchgear assembly featuring two working and one by-pass busbar systems.
Figure 2:
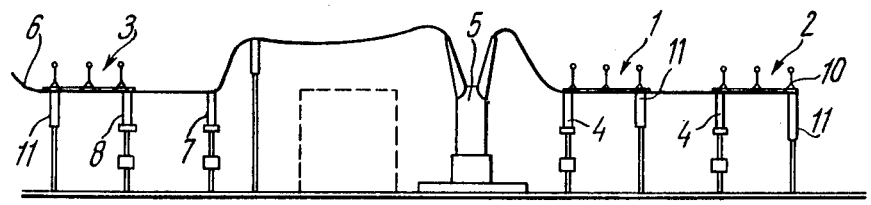
FIG. 2 shows a section view of one of the bays of FIG. 1 taken along line II—II.
Figure 3:
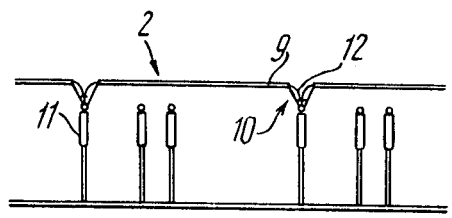
FIG. 3 shows a cross-section view of one of the working busbar systems along line III—III of FIG. 1.

Referring to FIGS. 1, 2, 3 the switchgear assembly under consideration comprises a first work system 1 of sectionalized busbars and a by-pass system 3 of sectionalized busbars.

The work systems 1 and 2 of sectionalized busbars are connected via busbar separators 4 to circuit breakers 5 of feeders 6, which are joined by means of line separators 7 to the switchgear assembly. Each feeder 6 is connected via separators 8 to the by-pass system 3 of sectionalized busbars.

The systems 1, 2 and 3 of sectionalized busbars are made as rigid sections 9 mounted upon bases 10 which are in their turn secured on insulating supports embodied the as busbar separators 4, the separators 8 and supporting insulators 11. Busbar compensators 12 are installed between adjacent sections 9 of sectionalized busbars.

Figure 4:
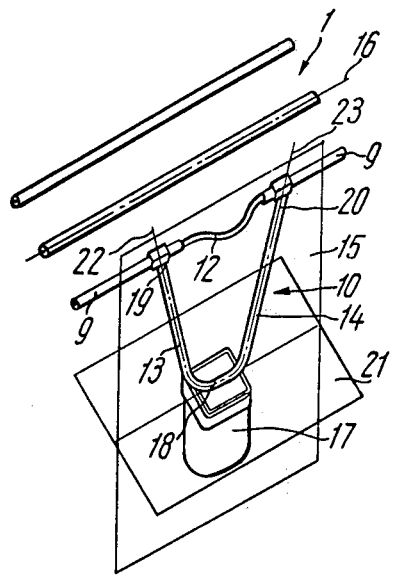
FIG. 4 shows an axonometric view of a sectionalized busbar unit, one of its phases being mounted on an insulated support by means of a base.

The base 10 comprises a leg 13 (FIG. 4) and a leg 14 which form an open configuration of the base 10 which is nearly U-shaped. The legs 13 and 14 are positioned in a plane 15 parallel to a longitudinal axis 16 of the system 1 of sectionalized busbars. The base 10 is mounted on an insulating support 17 in the discussed embodiment in a point 18 common for both legs 13 and 14. An end 19 of the leg 13 and an end 20 of the leg 14 are placed higher than the horizontal plane 21 going through the point 18.

The busbar compensator 12 is attached by its ends to the adjacent sections 9 of sectionalized busbars, which are secured at the ends 19 and 20 of the base 10. The busbar compensator 12 is positioned between a longitudinal axis 22 of the leg 13 and a longitudinal axis 23 of the leg 14 of the base 10.

Figure 5:
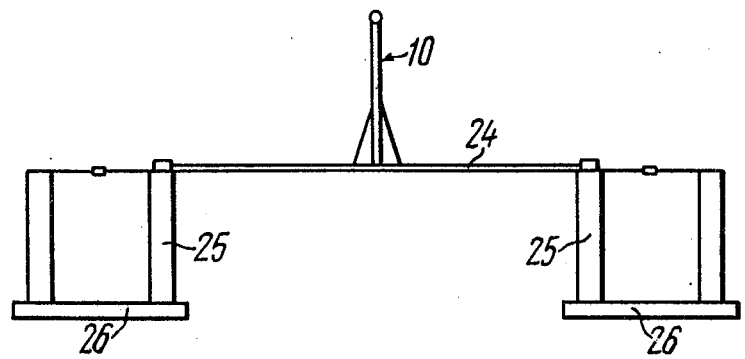
FIG. 5 shows a variation of securing of a base crosspiece of one of sectionalized busbars upon insulated supports, the electrical apparatuses of the switchgear assembly being used as these supports.
Figure 6:
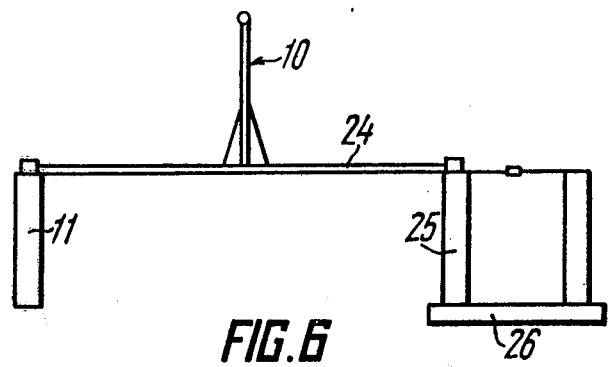
FIG. 6 shows a variation of securing of a base crosspiece of one of sectionalized busbars upon insulated supports, an electrical apparatus being used as a support from one side and a supporting insulator on the other side.
Figure 7:
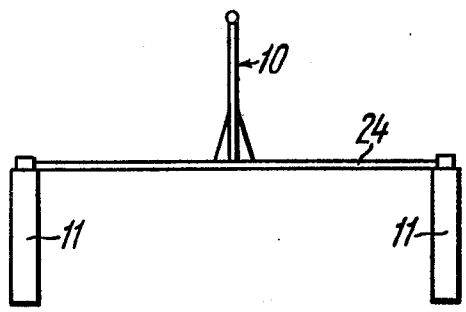
FIG. 7 shows a variation of securing of a base crosspiece of one of sectionalized busbars on supporting insulators.

The base 10 may be also provided with a cross-piece 24 (FIGS. 5,6,7) rigidly attached thereto. The cross-piece 24 in its turn may be secured by its ends to insulators 25 of electrical apparatuses 26 (FIG. 5), or by one end on the supporting insulator 11 (FIG. 6) and by the other end on the insulator 25 of the electrical apparatus 26, or on the supporting insulators 11 (FIG. 7).

Figure 8:
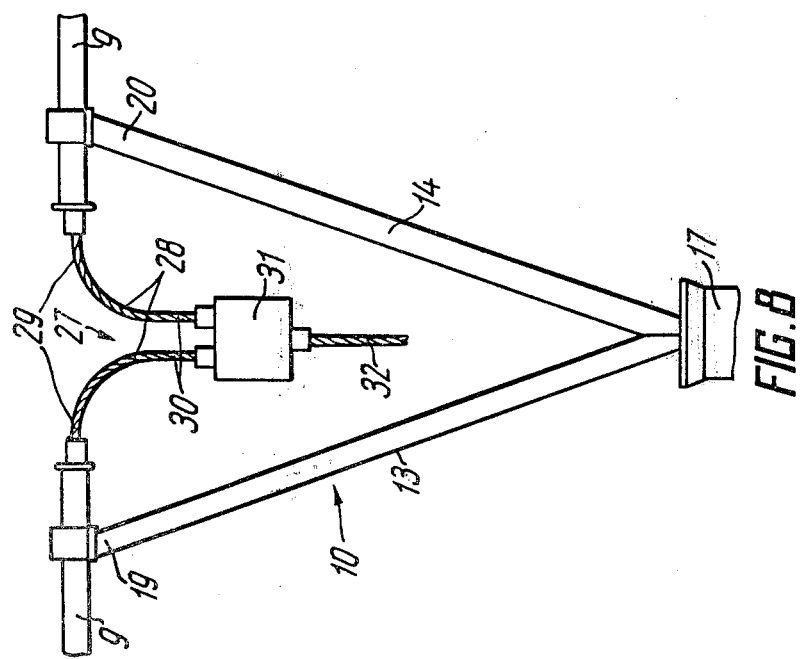
FIG. 8 shows a V-shaped base with the ends of the adjacent sections of the busbar being secured thereto and a busbar compensator connected to these ends and provided with a contact device of a sectionalized busbar branch.

Referring to FIG. 8, an embodiment of a busbar compensator 27 which is made of two flexible current-conducting members 28, their ends 29 being connected to the adjacent sections 9 of the sectionalized busbar and their ends 0 being joined together by means of a contact device, e.g. a plate 31 which is also linked to a branch 32 leading from the sectionalized busbar.

Figure 9:
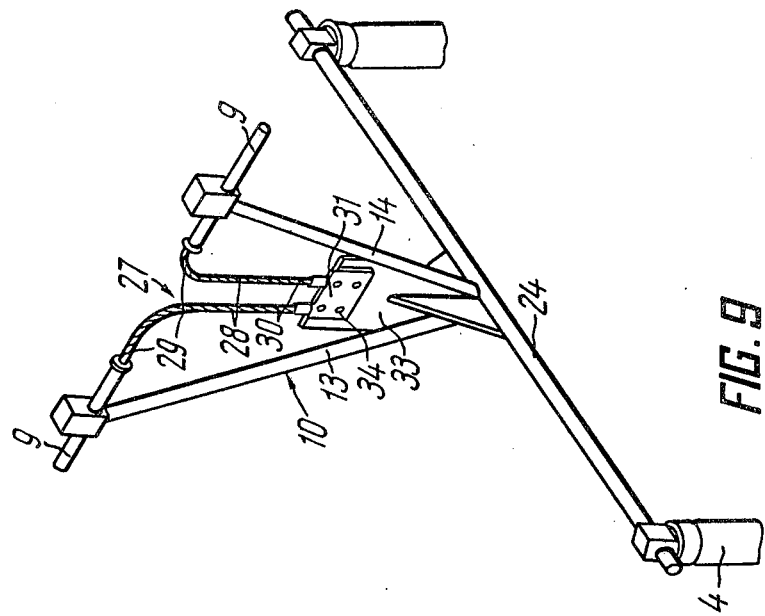
FIG. 9 shows the base of FIG. 8 provided with a contact member of a sectionalized busbar branch.

The base 10 may be also provided with a contact member made as a plate 33 (FIG. 9) whereto the contact plate 31 of the compensator 27 is attached, e.g. by bolts 34. In this case the branch leading from the sectionalized busbar to, for example, the busbar separator 4 comprises the flexible members 28 of the busbar compensator 27, the contact plates 31 and 33, the base 10 and its cross-piece 24.

Figure 10:
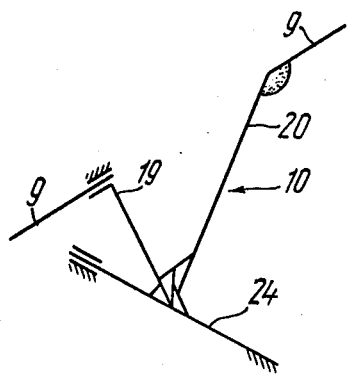
FIGS. 10, 11, 12 show variations of securing the ends of adjacent sections of a busbar to the base and the crosspiece to insulating supports.

To compensate temperature variations in length of rigid busbars the ends of adjacent sections 9 of sectionalized busbars are secured on the base 10 in such a way that the end of the section 9 is attached to the end 19 of the base 10 so that it can travel along its longitudinal axis (FIG. 10) and is attached to the end 20 rigidly; the cross-piece 24 is also attached by one of its ends so that it can travel along its longitudinal axis and by the other end rigidly.

Figure 11:
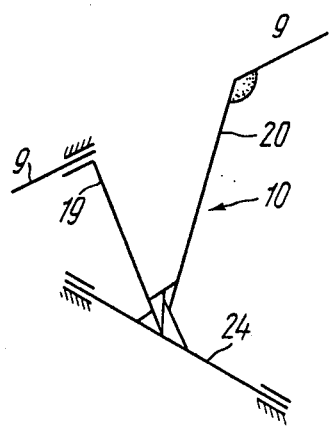

To reduce the value of loads acting on the insulated supports 17 (FIG. 8) of rigid busbars the cross-piece 24 (FIG. 11) of the base 10 can be also attached so that it can travel along its longitudinal axis by both its ends.

Figure 12:
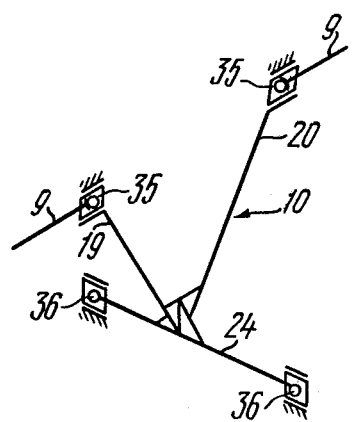

Referring to FIG. 12 the ends of the adjacent sections 9 of the sectionalized busbars are secured to the base 10 by means of ball-and-socket joints 35. The ends of the sections 9 can in this case be moved along their longitudinal axes. The cross-piece 24 of the base 10 is attached by means of cylindrical hinges 36 and in this case it can be moved along its longitudinal axis. Such method of attachment simplifies setting up of the switchgear assembly to a considerable degree, because tolerances of fixing dimensions of the members of which sectionalized busbars rest can be increased. Besides, the reliability of operation of the switchgear assembly is increased too, because any misalignments occuring in the process of operation in supporting structures are easily compensated.

One of the advantages of the foredescribed switchgear assembly consists in the fact that its sectionalized busbars can be put together at the plant resulting in higher reliability. Each sectionalized busbar can be manufactured and assembled at the plant completely, its sections being connected by flexible compensators. It can then be folded up and transported to the construction site. On the construction site of the switchgear assembly each sectionalized busbar is unfolded and each section is mounted in succession on bases secured on insulating supports.

This invention has been shown in the accompanying drawings (FIGS. 1–12). It is evident, however, that this invention may be used to create various other embodiments of an outdoor high-voltage switchgear assembly featuring different designs of its units, their arrangement and variants of attachment of sectionalized busbars on their supporting structures, which are within the spirit and scope of the invention as set forth in the appended claims.

What is claimed is:

1. An outdoor high-voltage switchgear assembly comprising:
   rigid sectionalized busbars;
   busbar compensators made of flexible current-conducting members connected to said rigid sectionalized busbars;
   bases of an open configuration mounting in said rigid sectionalized busbars;
   insulating supports carrying said bases;
   electrical apparatuses connected through branches to said rigid sectionalized busbars;
   said bases, each of them having legs forming said open configuration which is substantially U-shaped, said legs being positioned in the planes parallel to the longitudinal axes of the rigid sectionalied busbars, each base being secured on said insulating supports so that the ends of the base legs are higher than the horizontal plane going through the point common for said legs, each said busbar compensator being fastened by its ends to the adjacent sections of the rigid sectionalized busbars, which are secured on the ends of said legs of the base and positioned between the longitudinal axes of these legs.

2. An outdoor high-voltage swtichgear assembly as claimed in claim 1, wherein each said base of rigid sectionalized busbars is secured on the insulating supports by means of a cross-piece.

3. An outdoor high-voltage switchgear assembly as claimed in claim 2, wherein said cross-piece is mounted by its ends on the insulators of the electrical apparatuses.

4. An outdoor high-voltage switchgear assembly as claimed in claim 2, wherein said cross-piece is mounted by one of its ends on a supporting insulator, and by its other end on an insulator of the electrical apparatus.

5. An outdoor high-voltage switchgear assembly as claimed in claim 2, wherein said cross-piece is mounted by its ends on the supporting insulators.

6. An outdoor high-voltage switchgear assembly as claimed in claim 2, wherein each said busbar compensator is made of two flexible current-conducting members which are, by one of their ends secured to said adjacent sections of the sectionalized busbars mounted on the ends of said base and by the other of their ends joined together by means of a contact device connected to a branch of the sectionalized busbars.

7. An outdoor high-voltage switchgear assembly as claimed in claim 6, wherein each said base is provided with a contact member to connect it to the branch leading from the sectionalized busbars.

* * * * *